Jan. 22, 1952 W. NUMBERS 2,583,228
COMBINED LENS COVER AND LENS BRUSH
Filed July 8, 1946
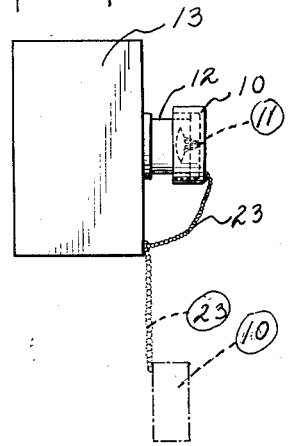
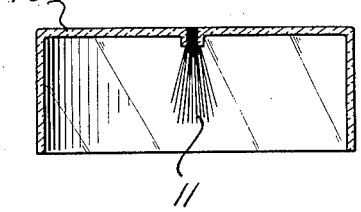
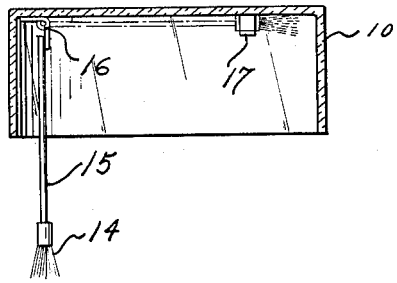
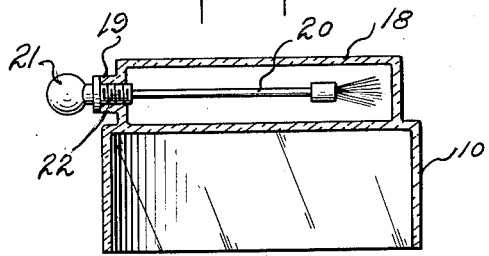
INVENTOR
WILLIAM NUMBERS
BY
Felix A. Russell
ATTORNEY

UNITED STATES PATENT OFFICE 2,583,228

COMBINED LENS COVER AND LENS BRUSH

William Numbers, Huntington, N. Y.

Application July 8, 1946, Serial No. 681,810

2 Claims. (Cl. 88—1)

The present invention relates to a combined lens cover and lens brush for the lenses of cameras, telescopes, binoculars and the like and has particular reference to a device of this kind which will keep a lens in a clean and operative condition at all times.

It is a particular object of the invention to provide a unitary structure including a dust cover and a brush for a lens.

A further object of the invention is the provision of various novel means for associating a lens cleaning brush with a lens cover.

Another object of the invention is the provision, in a device of this character, of means whereby a lens may be cleaned by a brush associated therewith and, at the same time, the operator may see through the cover portion and thus knowledgeably direct his work.

Other and further objects of the invention will become apparent from a reading of the following specification taken in conjunction with the drawings.

In the drawings:

Figure 1 is a side elevational view of one form of the invention mounted in position upon the lens of a camera, Figure 2 is an enlarged sectional view of a form of the invention, Figure 3 is a sectional view of another form the invention may take, and Figure 4 is a sectional view of still another form the invention may take.

Referring now more particularly to the drawings, there is shown therein a cover 10 having a brush 11 centrally mounted upon the inner side of the cover, which cover is adapted to engage the outer periphery of a lens assembly 12 of a camera 13, as shown in Figure 1. It is to be understood that in the case of a large lens two or more brushes may be carried by the cover in order to more fully contact and clean the lens.

In the form of the invention shown in Figure 3, it will be seen that, instead of a fixed brush as disclosed in Figures 1 and 2, there is provided a brush 14 having a handle 15 hinged upon the inner side of the cover 10 as indicated at 16. In this form, the handle is adapted to be held in position by means of a spring clip 17 or the like. In both the forms shown in Figures 1 and 2 and in the form shown in Figure 3, it will be seen that the cover is of transparent material.

In Figure 4, the cover 10 is provided with a brush housing 18 which is affixed in any suitable manner upon the outer side of the cover and which is provided further with a threaded neck portion 19 for the reception of a brush 20 having an operating handle 21 and a series of threads 22 for engagement with the neck portion 19.

In all cases it will be understood that the cover may be attached to the camera 12 by means of a chain 23 or like flexible member.

In operation, it will be readily apparent that the cover 10 is adapted to fit over the lens assembly and that, in the form of the invention shown in Figures 1 and 2, the brush 11 will normally be in actual contact with the lens and that, before removing the cover, the operator may further clean the lens by using the cover as a handle for the brush 11 at the same time observing his work through the transparent cover.

In the form of the invention disclosed in Figure 3, it will be seen that the operator may first remove the cover 10 from the lens assembly and then move the brush to the full line position indicated in Figure 3, whereupon he may clean the lens of the camera or like object at the same time observing his work through the transparent cover 10.

In the form of the invention shown in Figure 4, it is apparent that the operator may first remove the cover 10 from the lens assembly and then unscrew the brush 20 from its housing 18 and clean the lens by ordinary manipulation of the brush 18.

While but certain forms of the invention have been shown and described herein, it will be readily apparent to those skilled in the art that many minor modifications may be made without departing from the invention or the scope of the appended claims.

What is claimed is:

1. In a device of the character described, the combination with a lens assembly including a lens housing and a lens mounted therein, of a lens cover comprising a substantially flat member having flange means for frictionally engaging said lens housing for removably holding said cover on said lens housing, and a lens cleaning brush substantially centrally secured upon the inner side of said flat member and extending in a direction perpendicular to said flat member so as to contact the lens when the cover is in operative position upon the lens housing, the said frictional engagement permitting rotation of said cover and brush to thereby clean the lens, the said cover being formed of transparent material whereby the lens may be viewed while being cleaned.

2. In a device of the character described, the combination with a lens assembly including a lens housing and a lens mounted therein, of a lens cover comprising a substantially flat member having flange means for frictionally engaging said lens housing for removably holding said cover on said lens housing, and a lens cleaning brush substantially centrally and fixedly secured upon the inner side of said flat member and extending in a direction perpendicular to said flat member so as to contact the lens when the cover is in operative position upon the lens housing, the said frictional engagement permitting rotation of said cover and brush to thereby clean the lens.

WILLIAM NUMBERS.

REFERENCES CITED

The following references are of record in the file of this patent:

UNITED STATES PATENTS

| Number | Name | Date |
|---|---|---|
| 1,339,330 | Goelkel | May 4, 1920 |
| 1,476,604 | Foreman | Dec. 4, 1923 |
| 2,227,710 | Finn | Jan. 7, 1941 |
| 2,291,821 | McNabb | Aug. 4, 1942 |
| 2,362,251 | Eggleton | Nov. 7, 1944 |
| 2,401,367 | Nagel | June 4, 1946 |

FOREIGN PATENTS

| Number | Country | Date |
|---|---|---|
| 511,238 | Great Britain | Aug. 15, 1939 |